United States Patent [19]
Oakley

[11] Patent Number: 5,619,413
[45] Date of Patent: Apr. 8, 1997

[54] VEHICLE SUSPENSION COMPRISING AN ACTUATOR CONNECTED BETWEEN A VEHICLE BODY AND WHEEL IN WHICH CONTROL OF THE ACTUATOR IS DEPENDENT ON HYDRAULIC FLUID PRESSURE

[75] Inventor: Robin N. Oakley, Norfolk, United Kingdom

[73] Assignee: Lotus Cars Limited, United Kingdom

[21] Appl. No.: 360,796

[22] PCT Filed: Jul. 8, 1993

[86] PCT No.: PCT/GB93/01431

§ 371 Date: May 2, 1995

§ 102(e) Date: May 2, 1995

[87] PCT Pub. No.: WO94/01988

PCT Pub. Date: Jan. 20, 1994

[30] Foreign Application Priority Data

Jul. 8, 1992 [GB] United Kingdom .................. 9214543

[51] Int. Cl.$^6$ .................................................. B60G 17/015
[52] U.S. Cl. ..................... 364/424.046; 280/707; 280/840
[58] Field of Search ....................... 364/424.05; 280/707, 280/840

[56] References Cited

U.S. PATENT DOCUMENTS

| | | | |
|---|---|---|---|
| 5,044,662 | 9/1991 | Kawabata | 280/707 |
| 5,137,299 | 8/1992 | Jones | 280/707 |
| 5,162,995 | 11/1992 | Ikemoto et al. | 364/424.05 |

FOREIGN PATENT DOCUMENTS

| | | |
|---|---|---|
| 0114757A1 | 8/1984 | European Pat. Off. |
| 0190944 | 8/1986 | European Pat. Off. |
| 0264944A2 | 4/1988 | European Pat. Off. |
| 0283004A2 | 9/1988 | European Pat. Off. |
| 0398309A1 | 11/1990 | European Pat. Off. |
| 0415269A2 | 3/1991 | European Pat. Off. |
| 62-194918 | 8/1987 | Japan. |
| 63-106130 | 5/1988 | Japan. |
| 02237808 | 9/1990 | Japan. |
| 03090417 | 4/1991 | Japan. |
| 04039108 | 2/1992 | Japan. |
| 04085126 | 3/1992 | Japan. |
| PCT/GB90/00690 | 11/1990 | United Kingdom. |

Primary Examiner—Michael Zanelli
Attorney, Agent, or Firm—Westman, Champlin & Kelly, P.A.

[57] ABSTRACT

The present invention provides, with reference to the figure, a vehicle suspension system comprising an actuator (10) connected between the body (17) of a vehicle and a wheel and hub assembly (18) of the vehicle. A source of pressurized fluid (20) and an exhaust for fluid (24) are provided along with a valve (22) for controlling flow of fluid to the actuator (10) from the source of pressurized fluid (20) and/or from the actuator (10) to the exhaust for fluid (24). A sensor (27, 28, 30, 31, 32, 33, 34, 35, 41) is used to generate signals of sensed variable vehicle parameters. A control system for the vehicle suspension system is used which has a processor (25, 20) which processes the signals generated by the sensor (27, 28, 30, 31, 32, 33, 34, 35, 41). The processor (25, 26) outputs a control signal to the valve (22) and thereby controls the actuator (10). The processor in normal operating conditions uses a first set of preprogrammed constants (e.g. control loop gains, integrating factors, desired ride heights) in algorithms used by the processor to calculate the control signal outputted thereby. The processor uses a different set of preprogrammed constants in the algorithms for a chosen time period following activation of the system and/or at low vehicle speeds and/or a low pressure of fluid supplied by the source of pressurized fluid (20).

8 Claims, 7 Drawing Sheets

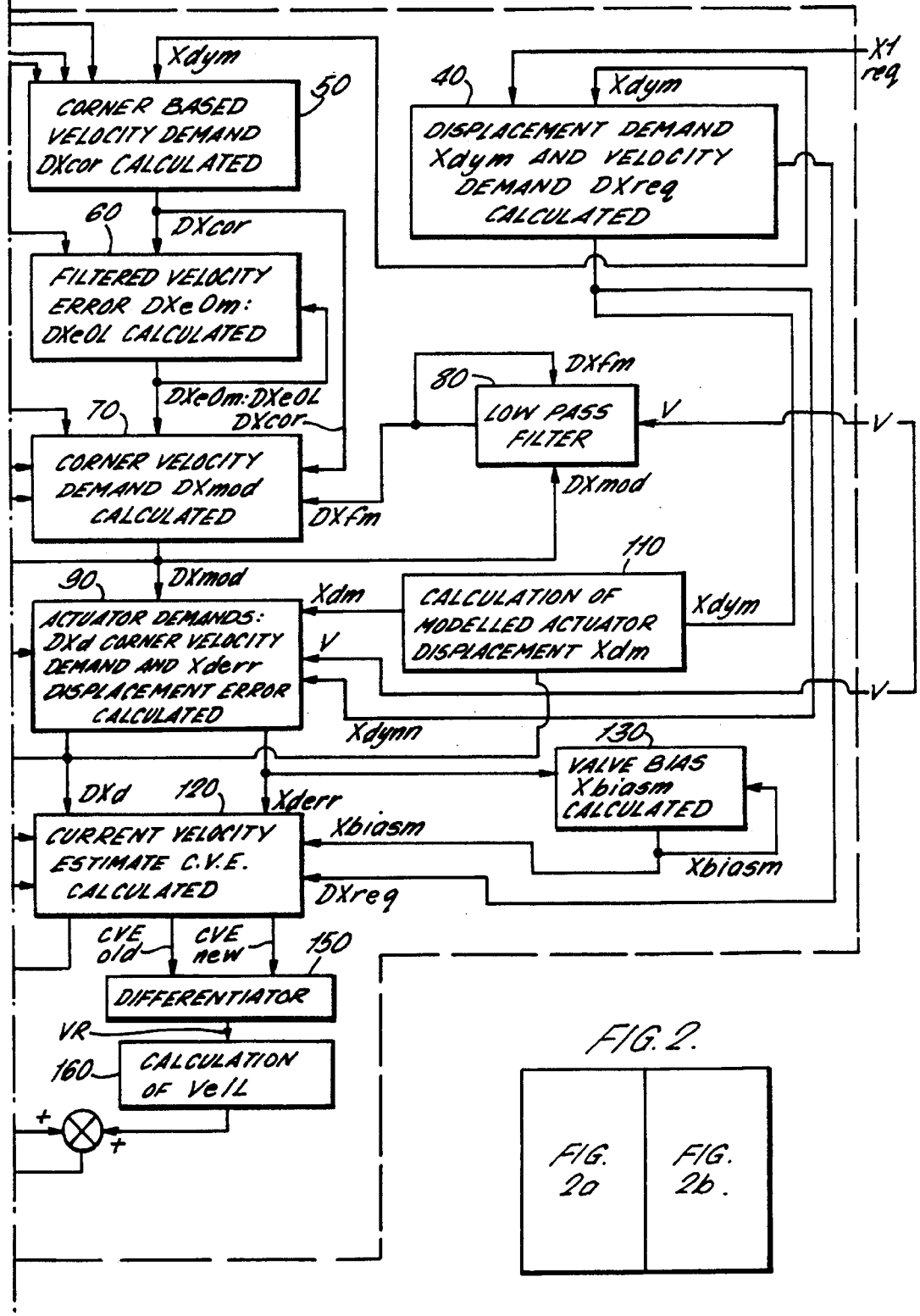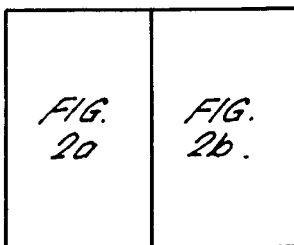

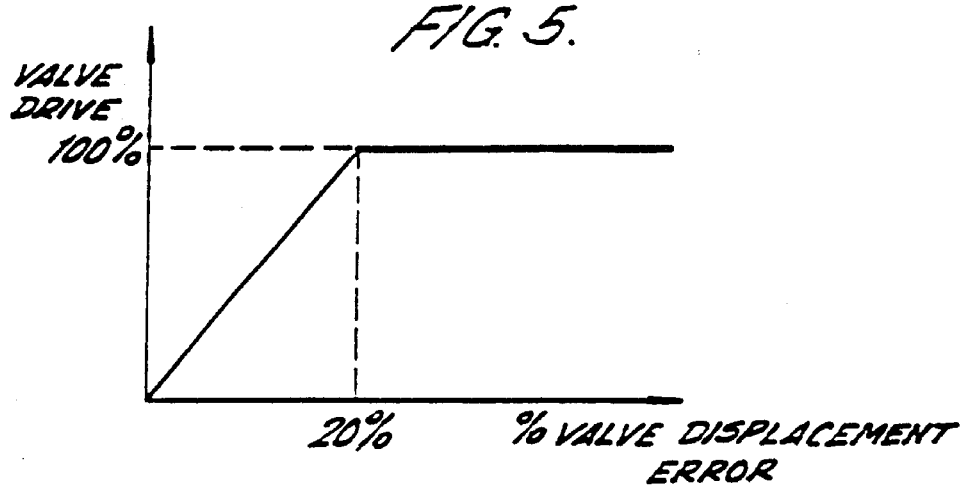
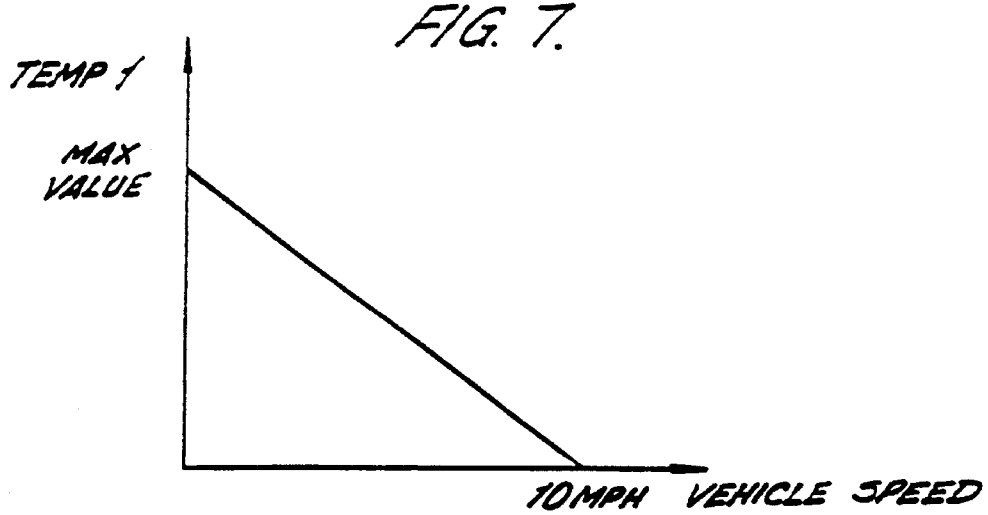
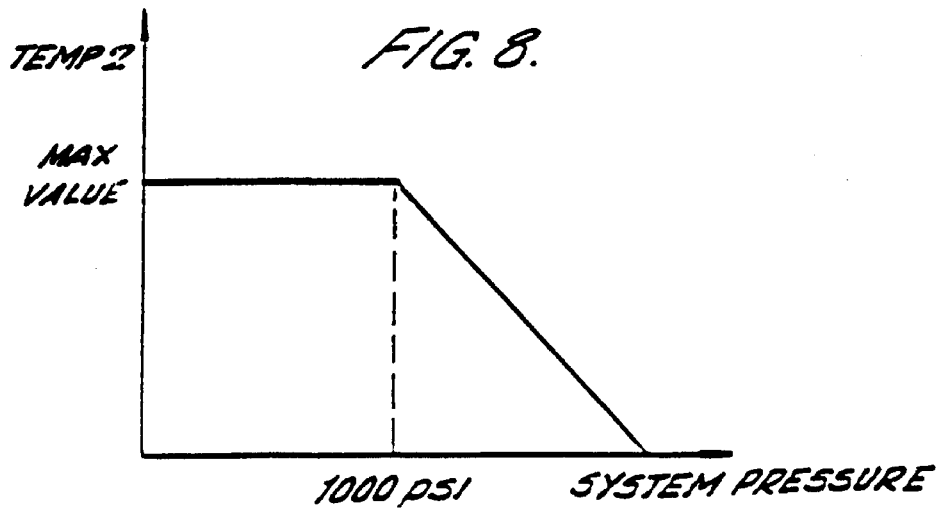

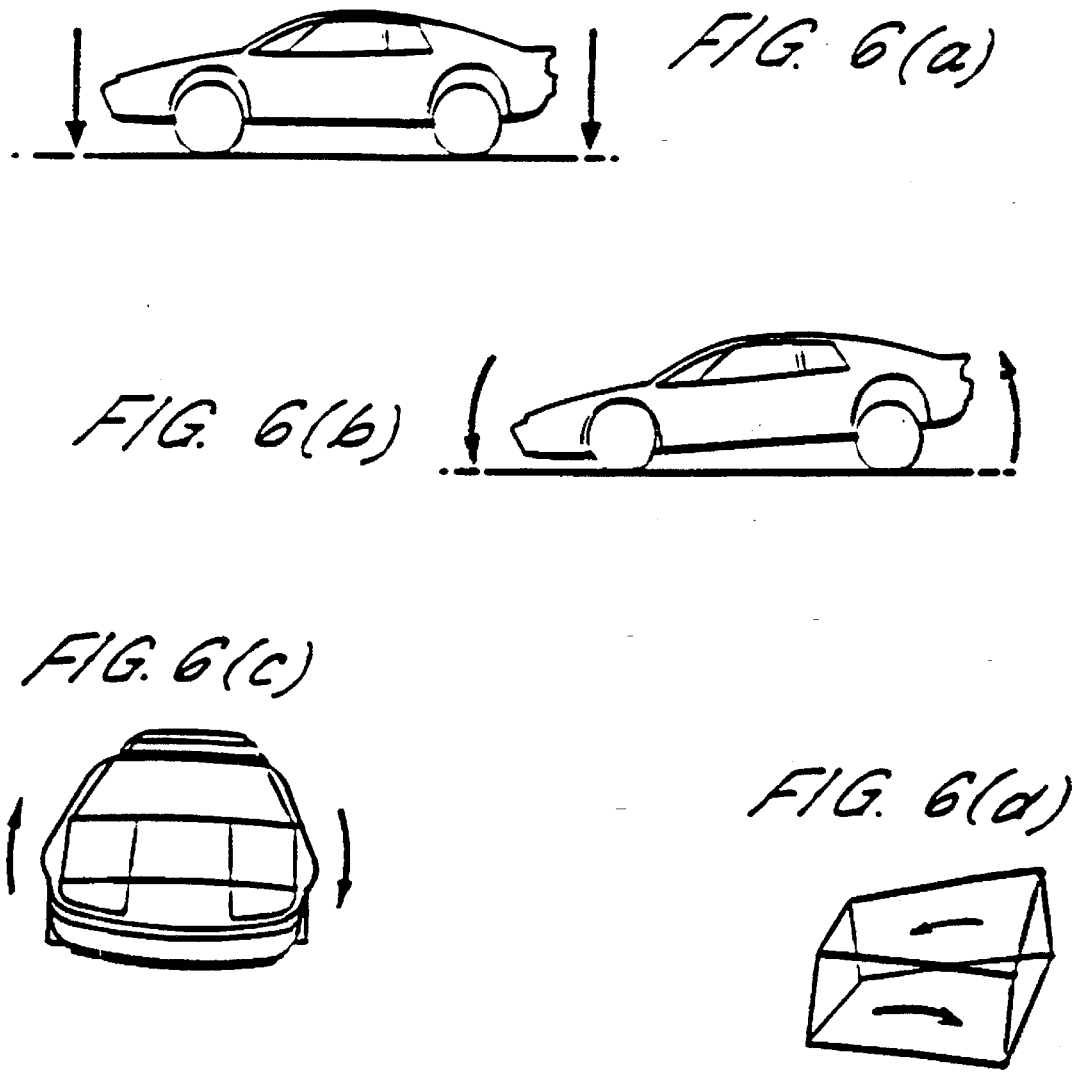

VEHICLE SUSPENSION COMPRISING AN ACTUATOR CONNECTED BETWEEN A VEHICLE BODY AND WHEEL IN WHICH CONTROL OF THE ACTUATOR IS DEPENDENT ON HYDRAULIC FLUID PRESSURE

BACKGROUND OF THE INVENTION

This invention relates to a vehicle suspension control system. By "vehicle" is meant all classes of vehicle capable of motion on land, and the term includes motor vehicles, lorry cabs and trailers, tractors and tracked vehicles.

In particular, the invention relates to a vehicle suspension control system for controlling the suspension of a vehicle having an active suspension system.

Active suspension systems are well known. For example, the applicant's European Patent Application No. EP-A-0114757 discloses an active suspension system in which a number of sensor inputs representing variables of vehicle motion are processed in a microprocessor to produce signals representing forces required at the points of support of the vehicle body on its wheel/hub assemblies. The required forces are applied by respective hydraulic actuators disposed between the vehicle body and each wheel/hub assembly to maintain as nearly as possible a constant attitude of the vehicle.

Active suspension systems operate on the principles either of measuring the forces acting between the vehicle body and the wheel/hub assemblies or of calculating such forces from measured values indicative of vehicle behaviour.

The main problem faced by the designer of an active suspension system is the difficulty that whilst the vehicle suspension system should respond to percurbations in the road (road inputs) by moving the actuators attached to the wheel and hub assembly, the suspension system should not cause the actuators to deflect in response to loads imposed upon the vehicle by reason of "driver inputs". "Driver inputs" include loads being placed on the suspension due to the covering and acceleration/decceleration of the vehicle. "Driver inputs" also include variations on the load of the vehicle due to load carried inside the vehicle and aerodynamic forces on the vehicle. Such "driver inputs" should generally net cause displacement of the actuators. In other words, the designer is faced with the problem of designing a suspension system which is "soft" to road inputs whilst being "hard" to driver inputs.

In PCT/GB 90/00690 a vehicle suspension control system is described which has processors which deal with loading arising from "driver" inputs separately from "road" input loading, the processors outputting separate control signals for each actuator which are combined into one control signal to control each actuator.

The present invention aims to deal with problems encountered with active suspension systems when they are activated and/or when the relevant vehicle is travelling slowly (i.e. moving away from rest).

In the active suspension systems of the prior art algorithms are used which have constants (e.g. gains and integrating factors) which remain unaltered for all velocities of the vehicle so that the processor controls the actuators in a fixed functional relationship to the inputs to the processor. This can be disadvantageous since whilst a system with quick response and high bandwidth is required to maintain vehicle control at high vehicle speeds, such a system can lead to ride harshness at low vehicle speeds, with the vehicle constantly moving and being too sensitive to inputs. Also on system start up the vehicle conditions are considerably different to operating conditions at speed (e.g. system operating pressure takes a while to build up) and again this can lead to problems.

In the systems of the prior arc inventions effort has been directed towards energy efficient systems that act as quickly as possible. The present invention recognises that advantages can be gained from modifying the control of the vehicle at start-up, at low speeds and/or at low system pressures.

SUMMARY OF THE INVENTION

The present invention provides a vehicle suspension system comprising;

an actuator connected between the body of the vehicle and a wheel and hub assembly of the vehicle, a source of pressurised fluid, an exhaust for fluid, valve means for controlling the flow of fluid to the actuator from the source if pressurised fluid and/or from the actuator to the exhaust for fluid, sensor means for generating signals indicative of sensed variable vehicle parameters and a control system for controlling the actuator comprising processor means which processes the signals generated by the sensor means and controls the valve means to control fluid flow to and/or from the actuator, the processor means outputting a control signal to the valve means and thereby controlling the actuator, wherein the processor means in normal operating conditions uses a first set of preprogrammed constants in algorithms used by the processor means to calculate the control signal outputted thereby, characterised in that the processor means uses a different set of preprogrammed constants in the algorithms for a chosen time period following activation of the system and/or at low vehicle speeds and/or at low pressures of the fluid supplied by the source of pressurised fluid.

The present invention has several aspects which each deal with the problem that the mode of control advantageous at high vehicle speeds is not suited to control of a vehicle on system start up and/or at low vehicle speeds and/or low pressure of the fluid for supply of pressurised fluid.

In the majority of active suspension systems actuators are used in parallel with road springs to support the weight of a vehicle. Generally the actuators will be controlled such that the "active" ride height of the vehicle (i.e. the height of the vehicle in motion, when controlled by the active suspension system) is lower than the "passive" ride height of the vehicle (i.e. the height of the vehicle when it is supported solely by the road springs). This is desirable since the spring force can then be used to assist the actuator in applying a downward force on the vehicle's wheels. This can enable matching of an actuator's "authority" (i.e. the difference between the maximum upward and downward forces than can be applied by the actuator) to the load requirements of a particular vehicle. If the spring force is not used in this manner then actuator areas would have to be increased with increases in cost, in packaging size and flow requirements.

Since the desired "active" ride height is generally lower than the "passive" ride height the driver will experience a downward jolt action when fluid is supplied to the actuators on starting the vehicle.

Even if the "active" ride height is equivalent the desired "passive" ride height for the vehicle, differences in "static" loading (passengers, fuel, luggage) will cause a difference between the two heights. With heavy loading the ride height of the vehicle on up may well be lower than the required active ride height and the actuators of the suspension system will be controlled initially to raise the vehicle to the required active ride height. Therefore a jolt to the vehicle body will again be experienced on pressurisation of actuators due to the difference between passive and active ride heights.

The present invention provides a vehicle suspension system comprising:

an actuator connected between the body of the vehicle and a wheel and hub assembly of the vehicle, a read spring connected between the body of the vehicle and the wheel and hub assembly in parallel with the actuator, a source of pressurised fluid, an exhaust for fluid, valve means for controlling flow of fluid to the actuator from the source of pressurised fluid and/or from the actuator to the exhaust for fluid, sensor means to generate signals indicative of a plurality of vehicle parameters, electrical or electronic processor means which processes the signals generated by the sensor means, the processor means outputting a control signal to the valve means and thereby controlling the actuator, wherein when the passive ride height of the vehicle supported by the road spring alone is different from the active ride height of the vehicle when the processor means is operative, the processor means within a chosen time period from activation of the suspension system and/or at low vehicle speeds and/or at low pressures of fluid supply is characterised by ramping the ride height of the vehicle from the passive ride height to the active ride height at a rate determined by a ramping means provided in the processor means.

Thus a driver in a vehicle with a vehicle suspension system in accordance with the present invention will experience a jolt when the system is activated.

Wandering motion of the actuators can also be a problem when the system is first pressurised.

The control signal for an actuator is supplied to the valve controlling the flow of fluid to and from the actuator. The control signal generally demands a movement of the valve than is at least in part proportional to the difference between the measured distance of the wheel from the vehicle body and the desired distance calculated for a particular set of conditions. The control signal also typically has a bias component which biases the valve to an offset position to counter static loads. For instance, in a system where an actuator is used in parallel with a road spring, the road spring (as explained above) will usually be compressed when the vehicle moves from passive to active ride height on start up. The valve must be controlled so that the difference in mean pressure of fluid across the actuator piston over a period of time is sufficient to counteract the load applied by the compressed road spring. The offset position of the spool in order to counteract the force of the compressed spring will cause one side of the actuator to be exposed to a slightly higher pressure than the other. There is generally never a condition where one side of the actuator is fully closed since there is always leakage. Around null the differential pressure across the piston of the actuator is achieved by effectively tuning this leakage. The bias component of the control signal is generally generated as a function of the average of the measured displacement error between the desired and actual displacement of the actuator, e.g. by use of a suitable low pass filter.

The bias component of the signal is only calculated after the system is pressurised and to date has generally been initially set at zero for start up. The drive to bring the vehicle to active ride height therefore has been initially derived from a displacement error control loop in the control algorithms for controlling the vehicle in motion. If the gain of the loop is low then the system tends to wander until the bias component term is established through integration in the low pass digital filter and solely provides the drive necessary to hold the actuator steady.

The present invention in one aspect provides a vehicle suspension system comprising:

an actuator connected between the body of the vehicle and a wheel and hub assembly of the vehicle, a source of pressurised fluid, an exhaust for fluid, and a control system for controlling the actuator comprising:

sensor means for generating signals indicative of forces on the vehicle and length of the actuator, valve means for metering flow of fluid from the source of pressurised fluid to the actuator and/or from the actuator to the exhaust for fluid, electrical or electronic processor means for processing the signals generated by the sensor means and for outputting a control signal to the valve means to vary the length of the actuator, wherein the control system has a closed loop displacement error control system and a system for biasing the valve means to an offset condition in which the fluid flow to and/or from the actuator is controlled such that the actuator applies a force sufficient to counter loading on the actuator and thereby maintain a required ride height, the processor means being characterised by having memory means which stores on deactivation of the suspension system the value of one or more signals generated by the sensor means and/or by the system for biasing the valve means, the processor means using the stored value or values when the suspension system is next activated.

Thus a desired ride height is quickly established and wandering motion is avoided.

The present invention further provides a vehicle suspension system comprising:

an actuator connected between the body of the vehicle and a wheel and hub assembly of the vehicle, a source of pressurised fluid, an exhaust for fluid, and a control system for controlling the actuator comprising:

sensor means for generating signals indicative of forces on the vehicle and length of the actuator the velocity of the vehicle and the fluid pressure of the fluid from the source of pressurised fluid, valve means for metering flow of fluid from the source of pressurised fluid to the actuator and/or metering flow of fluid from the actuator to the exhaust for fluid, electrical or electronic processor means for processing the signals generated by the sensor means and for outputting a control signal to control the valve means to vary the length of the actuator, wherein the control system comprises a closed displacement error control loop and a control loop for biasing the valve means to maintain a required ride height for the vehicle, characterised in that the gain in the displacement error loop is varied with changes in the velocity of the vehicle and/or system pressure.

Thus the problem of, wandering can also be cured by increasing the gain of the displacement error control loop to allow establishment of the desired ride height at a reasonable rate when the system is activated, with the gain varied to be suitable for moving conditions with increased velocity.

A further problem can arise on start up if the active suspension system uses "energy saving" actuators such as described in EP033213 which use bypass valves to connect both chambers of the actuators together when certain operating conditions are met. The chambers are connected together when the force on the actuator is in the same sense as the velocity required of the actuator, whereby desired motion of the actuator is occasioned without the need to supply hydraulic fluid under pressure. The desirable parked position of a bypass valve is only just shut, so that minimum drive is required to open it. The bypass valves operate by an closed loop control system based on spool displacement error which is integral to the spool valve. If the bypass valves are slightly open on start-up and are required to be closed, there may be insufficient drive to move the spool valve. This operation will also be hampered by lack of hydraulic system pressure due to the bypass valves being open. This problem can again lead to wandering upon "start-up".

The present invention additionally provides a suspension system for a vehicle comprising:

an actuator connected between the body of the vehicle and a wheel and hub assembly of the vehicle, a source of pressurised fluid, an exhaust for fluid, valve means for metering flow of fluid to the actuator from the source of pressurised fluid and/or flow of fluid from the actuator to the exhaust for fluid, sensor means for generating signals indicative of forces on the vehicle electrical or electronic processor means for processing the signals generated by the sensor means and controlling the valve means to vary the length of the actuator, wherein the actuator comprises a piston and cylinder, arrangement having two chambers in the cylinder divided by the piston, the valve means comprises means to connect both chambers together to allow flow from one chamber to the other and the processor means controls the valve means to connect both chambers together when the net force on the actuator is in the same sense as the motion of the actuator required by the processor means, characterised in that the processor means is adapted to control the valve means such that the valve means do not connect both chambers together for a chosen time period after the suspension system is activated and/or until a chosen velocity threshold is reached and/or until a chosen fluid pressure threshold is reached.

Thus the energy saving bypass valve is certainly fully shut when the suspension system is activated and wandering is avoided.

Wandering motion has also been found to be a problem when a vehicle with an active suspension system when a vehicle with active suspension system is stationary or is at very low speed. This is due in part to the high load gain which is a necessity at speed which should be reduced at very low speeds. The control system for controlling the actuators is necessarily of high gain to enable adequate control of the actuators when the vehicle is moving at speed. However, such high gain is not required whilst the vehicle is moving at slow speeds and its use results in constant motion of the vehicle when it is stationary or moving slowly.

The present invention further provides a vehicle suspension system comprising:

an actuator connected between the body of the vehicle and a wheel and hub assembly of the vehicle, a source of pressurised fluid, an exhaust for fluid, and a control system for controlling the actuator comprising:

sensor means for generating signals indicative of the forces on the vehicle, the length of the actuator and the velocity of the vehicle, valve means for metering flow of fluid to the actuator from the source of pressurised fluid and/or flow of fluid from the actuator to the exhaust for fluid, electrical or electronic processor means for processing the signals generated by the sensor means and for controlling the valve means to vary the length of the actuator, wherein the control system includes a force control loop characterised in that a gain is used in the force control loop which is varied by the processor means as a function of vehicle velocity.

Thus the gain of the force control loop is varied with vehicle velocity so that constant motion of the vehicle whilst stationary is avoided, but adequate control of the vehicle at speed is maintained.

A further problem in coping with differences between conditions during vehicle motion and conditions whilst the vehicle is stationery arises from the need to have a self-levelling system which does not allow the vehicle body to move substantially when the vehicle is loaded whilst stationery (e.g. by luggage, passengers, fuel etc.). Any such movement should be removed by the self-levelling system at a reasonable rate. However, if the parameters required by a reasonable levelling rate for a stationary vehicle are also used during vehicle motion then they have a detrimental effect on vehicle ride by adding an additional stiffness.

The present invention further provides a vehicle suspension system comprising:

an actuator connected between the vehicle body and a wheel and hub assembly of the vehicle, a source of pressurised fluid, an exhaust for fluid, and a control system for controlling the actuator comprising:

sensor means for generating signals indicative of forces on the vehicle, length of the actuator and velocity of the vehicle, valve means for motoring fluid flow to the actuator from the source of pressurised fluid and/or from the actuator to the exhaust for fluid, and electrical or electronic processor means for processing the signals generated by the sensor means and for outputting a control signal to control the valve means to vary the length of the actuator, wherein the control system has a closed displacement error loop controlling vehicle ride height which controls the valve means to bring the vehicle to a desired ride height calculated by the processor means characterised in that the vehicle is brought to the desired ride height at a levelling rate which is variable with vehicle velocity, the rate being governed by one or more variable gains in the closed displacement error loop which are varied by the processor means as a function of vehicle velocity.

Thus reasonable self levelling characteristics for the vehicle are provided whilst it is stationary or moving slowly, whilst adequate performance of the suspension system at speed is maintained.

BRIEF DESCRIPTION OF THE DRAWINGS

A preferred embodiment of the present invention will now be described with reference to the accompanying drawings in which;

FIG. 5 is a graph showing typical valve drive characteristics for a standard spool valve drive.

FIGS. 6a, 6b, 6c and 6d show the displacement modes of the vehicle body considered by the central processor of the active suspension system shown in FIG. 1.

FIG. 7 illustrates the relationship between a variable Temp 1 used by the central control processor of the active suspension system shown in FIG. 1 and vehicle speed.

FIG. 8 illustrates the relationship between a variable Temp 2 used by the central control processor and the pressure of fluid in the system.

DESCRIPTION OF THE PREFERRED EMBODIMENTS

Figure 1:
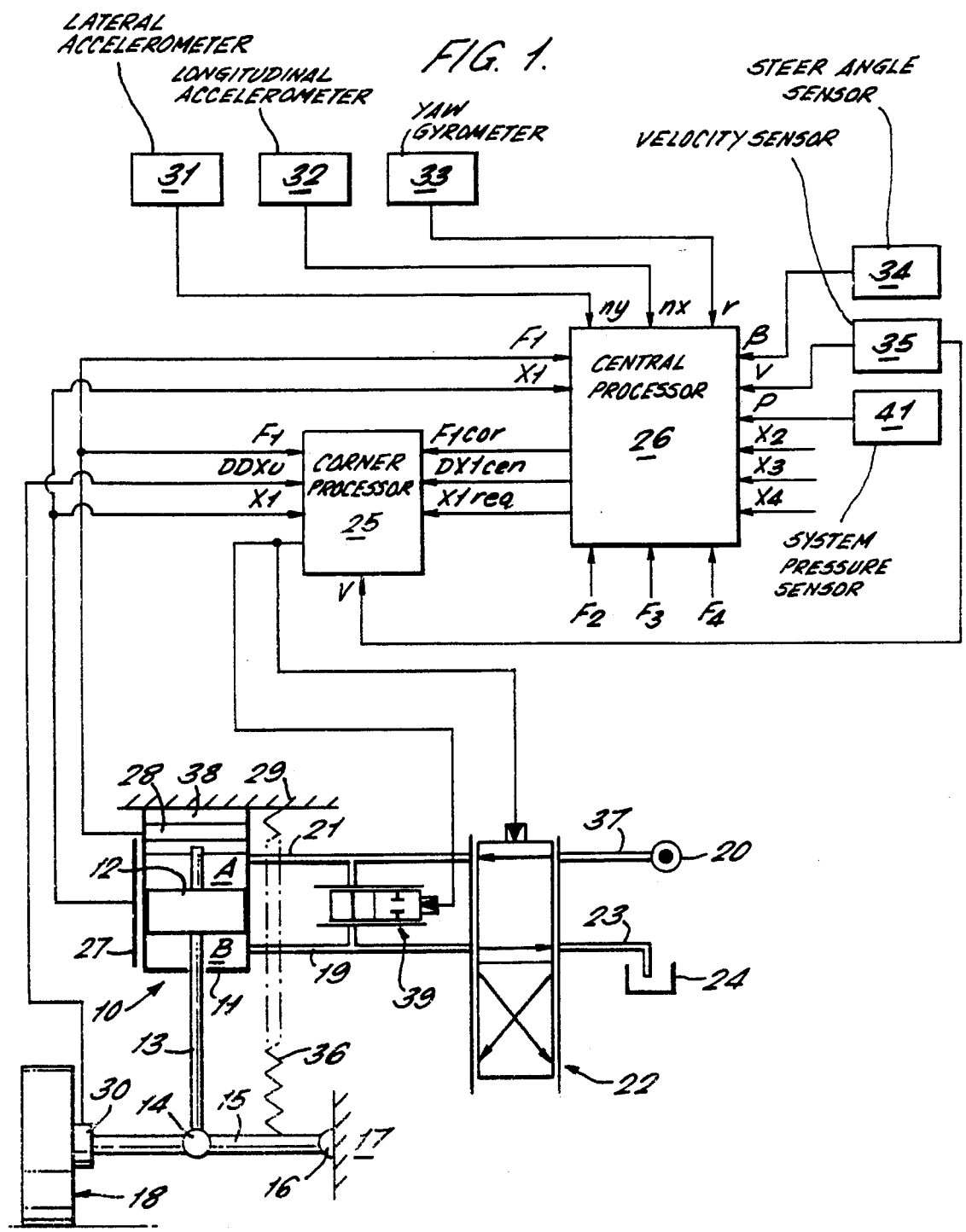
FIG. 1 is a schematic representation of a part of an active suspension control system of an embodiment of an active suspension control system according to the invention.

Referring to FIG. 1, an active suspension system according to the invention can be seen to comprise an actuator 10 formed from a cylinder 11 with a piston 12 movable therein.

The piston 12 is connected by connecting rod 13 and pivot joint 14 to a suspension arm 15 of a motor vehicle which is pivotally mounted by a joint 16 to the vehicle body schematically shown at 17. A vehicle wheel and hub assembly 18 is mounted on the suspension arm 15. A road spring 36 acts in parallel with the actuator 10 between the vehicle body and the suspension arm 15 and shares load with the actuator. The road spring is chosen such that the "passive" ride height of the vehicle (its height when supported by road springs alone) is higher than its "active" ride height (the mean height at which the vehicle travels under control of the active suspension system). Thus the actuator 10 compresses the spring 37 when initially pressurised.

The lower chamber B of the actuator and the upper chamber A of the actuator 10 are respectively connected by lines 19 and 21 to a servo-valve 22. The servo-valve 22 can connect the chamber A by a hydraulic line 37 to a source of pressurised fluid 20 and the chamber B by a line 23 to an exhaust for pressurised fluid 24 or vice versa. The exhaust for pressurised fluid is commonly a sump forming the fluid return to the source of pressurised fluid 20, which is commonly a pump powered by electricity or by mechanical effort from the engine of the vehicle.

The servo-valve 22 is controlled by electric control signals and can be controlled to meter the flow of fluid into and/or out of the chamber A of the actuator 10.

An energy saving valve 39, again a servo-valve, is also provided, which can be controlled to connect chambers A and B together to enable motion of the piston 12 without the need for supply of pressurised fluid from the source 20.

The servo-valve 22 and energy saving valve 39 are controlled by a control system which comprises a corner processor 25 and a central processor 26. Both of these processors are in the preferred embodiment digital control processors, the corner processor 25 operating at a clock frequency typically ten times faster than the clock frequency of the central processor 26.

An LVIT 27 is provided to measure the displacement of the piston 12 within the cylinder 11 and this provides a signal X1, indicative of the position of the piston 12, the signal X1 being relayed to both the corner processor 25 and the central processor 26.

A force transducer 28 is interposed between the actuator 10 and the vehicle body (shown schematically at 29). The force transducer generates a signal F1 indicative of the force on the vehicle body 29 and the signal F1 is relayed to both the corner processor 25 and the central processor 26. An isolator 38 of resilient material is provided between the force transducer 28 and the vehicle body 29 to absorb high frequency loading that cannot be dealt with by the active suspension system.

An accelerometer 30 is provided on the wheel and hub assembly 18 and this generates an electrical signal DDXu indicative of the acceleration of the wheel and hub assembly 18 and this signal DDXu is transmitted to the corner processor 25.

The central processor 26 also receives a lateral acceleration signal Ny indicative of the lateral acceleration of the vehicle from a lateral accelerometer 31. A further accelerometer 32 provides a signal Nx indicative of the longitudinal acceleration of the vehicle. A yaw gyrometer 33 provides a signal r indicative of yaw rate of the vehicle (the rate at which the vehicle rotates about an axis perpendicular to the principal plane of the vehicle). A sensor 34 connected to the steering mechanism of the vehicle measures the steer angle β of the front wheels. A sensor 35 is provided to measure the velocity v of the vehicle. A sensor 41 is provided to measure the pressure of the fluid in the hydraulic control system, "the system pressure" P.

The corner processor 25 receives a signal from the sensor 35 indicative of vehicle velocity V.

Only one actuator 10 and associated corner processor 25 are shown in FIG. 1. However, each vehicle wheel will have an actuator and an associated corner processor. Each wheel will also have a force transducer, a hub accelerometer and an LVIT. The signals indicative of sensed forces and displacements at all four wheels of the four-wheeled vehicle of the preferred embodiment described are provided to the central processor 26 as F2, F3 and F4 and also X2, X3 and X4.

The central processor resolves the signals it receives into modal co-ordinates. The central processor 26 considers the forces acting on the vehicle and the resulting displacements of the vehicle as comprising four different types, heave, pitch, roll and warp. Displacements arising from modal forces are shown in FIGS. 6a, 6b, 6c and 6d.

FIG. 6a shows heave displacement, which is displacement directly upwardly and downwardly of the vehicle body. The processor considers a downward heave displacement to be a positive heave.

FIG. 6b shows a pitch displacement of the vehicle body, that is to say a rotation about an axis perpendicular to the longitudinal principal axis of the main body. The processor considers a pitching with nose down to be positive.

FIG. 6c shows the roll displacement of the vehicle considered by the actuator. The roll displacement is a displacement of a vehicle about the longitudinal axis of the vehicle. A roll with the lefthand side of the vehicle downwards is considered positive.

FIG. 6d shows the warp mode displacement of the vehicle considered by the actuator. The warp displacment arises when the forces acting on the vehicle's-four wheels tend to apply torque in opposing directions at either end of the vehicle. A warp with the lefthand front and righthand rear downwards is considered positive.

The active suspension system aims to maintain constant loads on the vehicle body and tyres to improve the vehicle stability and reduce noise input.

The operation of the central control processor and the corner control processor will now be discussed separately.

The Central Control Processor

The central control processor functions in modal coordinates. It converts the measured forces at the actuators into modal forces as follows:

1. Heave Force

| | | |
|---|---|---|
| $Hf$ | = | $K_1 * [IVrfH*(F1 + F1sp + F2 + F2sp) +$ |
| | | $IVrrH * (F3 + F3sp + F4 + F4sp)] + Hfsp$ |
| where $Hf$ | = | Heave force |
| $F1,F2,F3,F4$ | = | forces measured by the load cells |
| $F1sp,F2sp,$ $F3sp,F4sp$ | = | forces transmitted to the vehicle body by the road springs acting in parallel with the actuators |
| $IVrfH$ | = | a correction constant to scale forces measured by the load cells on the front wheels |
| $IVrrh$ | = | a correction constant to scale the forces measured by the load cells at the rear wheels |
| $K_1$ | = | scaling constant chosen to enable factors to have fractional values and to achieve maximum resolution by a 32 bit accumulator used by the control devices |
| $Hfsp$ | = | force correction term |

The IVrfH and IVrrH terms are necessary since each actuator (e.g. 10) acts on a pivot arm (e.g. 15) connected to a wheel and hub assembly (e.g. 10) and therefore the force transmitted to the wheel and hub assembly differs from that measured by the actuator and therefore must be scaled accordingly.

The F1sp, F2sp, F3sp and F4sp terms account for forces transmitted to the vehicle body by the road springs (e.g. 36) that act in parallel with the actuators. They are calculated as follows:

| | | |
|---|---|---|
| $F1sp$ | = | $K_2 * X1 * Kcs1$ |
| $F2sp$ | = | $K_2 * X2 * Kcs2$ |
| $F3sp$ | = | $K_2 * X3 * Kcs3$ |
| $F4sp$ | = | $K_2 * X4 * Kcs4$ |
| where | | |
| $X1,X2,X3X4$ | = | measured actuator displacements |
| $Kcs1,Kcs2,Kcs3$ $Kcs4$ | = | Road spring stiffnesses |
| $K_2$ | = | scaling constant to enable forces to have fractional values and to achieve maximum resolution by a 32 bit accumulator used by the control processors. |

The Hfsp is a force correction term that is calculated for a particular suspension configuration to account for forces to the vehicle body through load paths that do not pass through the actuator and also to remove from the measured load any heave forces that arise from lateral forces acting on the tyre which have a moment about the pivot point of the suspension arm and therefore are transmitted to the vehicle body. It is not essential to the invention and has been described in previous published patent specifications, such as PCT/GB 90/00628.

2. Pitch Force

| | | |
|---|---|---|
| $Pf$ | = | $K_1 * [IVrfP*(F1 + F1sp + F2 + F2sp) -$ |
| | | $IVrrP * (F3 + F3sp + F4 + F4sp)] + Pfsp$ |
| where $Pf$ | = | Modal Pitch Force |
| $F1,F2,F3,F4$ | = | forces measured by the load cells |
| $F1sp,F2sp,$ $F3sp,F4sp$ | = | forces transmitted to vehicle body by the road springs (see above) |
| $IVrfP$ | = | a constant to scale the forces acting on the front wheels to account for their moment about the centre of gravity of the vehicle |
| $IVrrP$ | = | a constant to scale the forces acting on the rear wheels to account for their moment about the centre of gravity of the vehicle |
| $K_1$ | = | scaling constant (as hereinbefore described) |
| $Pfsp$ | = | correction term for unmeasured forces |

3. Roll Force $Rf = K_1 * [IVrfR * [(F1 + F1sp) - (F2 + F2sp)] + IVrrR * [(F3 + F3sp) - (F4 + F4sp)]] + Rfsp$ where
- $Rf$ = Modal Force Roll
- $F1, F2, F3, F4$ = forces measured by the load cells
- $F1sp, F2sp, F3sp, F4sp$ = forces transmitted to vehicle body by road springs (see above)
- $IVrfR$ = a constant to scale the forces acting on the front wheels to account for the moment of the forces about an axis longitudinal of the vehicle through its centre of gravity
- $IVrrR$ = a constant to scale the forces acting on the rear wheels to account for the moment of the forces about an axis longitudinal of the vehicle through its centre of gravity.
- $K_1$ = scaling constant (as hereinbefore described)
- $Rfsp$ = correction force for unmeasured forces

4. Warp Force $Wf = K_1 * [IVrfW * [(F1 + F1sp) - (F2 + F2sp)] - IVrrW * [(F3 + F3sp) - (F4 + F4sp)]] + Wfsp$ where
- $Wf$ = Modal Warp Force
- $F1, F2, F3, F4$ = forces measured by the load cells
- $F1sp, F2sp, F3sp, F4sp$ = forces transmitted to vehicle body by the road springs (see above)
- $IVrfW$ = a constant to scale the forces acting on the front wheels to convert them to a torque applied to the vehicle body
- $IVrrW$ = a constant to scale the forces acting on the rear wheels to convert them to a torque applied to the vehicle body
- $K_1$ = scaling constant (as hereinbefore described)
- $Wfsp$ = correction term for unmeasured loads The central control processor also calculates the "driver input" or "dynamic" forces generated by the vehicle inertia in manoeuvres such as braking and cornering using the signals it receives indicative of vehicle yaw rate, longitudinal acceleration, lateral acceleration, velocity and steer angle, as follows;

5. Heave Dynamic Force $HFdyn = K_3 * [HCnx * Snx + Hcny * Msny + HCDr * MDr + HCv * V2]$ where
- $K_3$ = scaling constant to make best use of processor capacity
- $HFdyn$ = dynamic heave force
- $HCnx$ = deceleration/acceleration compensation gain in heave - calculated from test data
- $HCny$ = lateral compensation gain in heave - calculated from test data
- $HCDr$ = yaw acceleration compensation gain in heave - calculated from test data
- $Snx$ = scaled lateral acceleration (scaled to accord with scaling of other parameters to utilise full capacity of processor)
- $Msny$ = absolute value of scaled lateral acceleration (scaled for the same reasons as $Snx$)
- $MDr$ = absolute value of estimated yaw acceleration
- $HCv$ = aerodynamic heave compensation gain (accounts for aerodynamic loading on vehicle)
- $V2$ = velocity squared

6. Pitch Dynamic Force $PFdyn = K_3 * [PCnx * Snx + PCny * MSny + PCDr * MDr + PCv * V2]$ where
- $K_3$ = scaling constant (described above)
- $PFdyn$ = dynamic pitch force
- $PCnx$ = deceleration and acceleration compensation gain in pitch - calculated from test data
- $Snx$ = scaled longitudinal acceleration
- $PCny$ = clockwise/anti-clockwise lateral compensation gain in pitch - calculated from test data
- $MSny$ = absolute scaled lateral acceleration
- $PCDr$ = yaw acceleration compensation gain in pitch - calculated from test data
- $MDr$ = absolute estimated yaw acceleration
- $PCv$ = aero-dynamic pitch compensation gain
- $V2$ = velocity squared

7. Roll Dynamic Force $$RFdyn = K_3*[RCnx*Snx + RCnyc*Sny + RCDr*MDr]$$

where

| | | |
|---|---|---|
| $K_3$ | = | scaling constant (described above) |
| $RFdyn$ | = | dynamic roll force |
| $RCnx$ | = | deceleration and acceleration compensation gain in roll - calculated from test data |
| $RCnyc$ | = | conditioned roll compensation gain |
| $Snx$ | = | scaled longitudinal acceleration |
| $Sny$ | = | scaled lateral acceleration |
| $RCDr$ | = | yaw acceleration compensation gain in roll - calculated from test data |
| $MDr$ | = | absolute yaw acceleration |

In the present invention the roll compensation gain is modified with vehicle speed by setting:

$$RCnycnew = (Ryncold*VgainQ)/32768$$

where $$VgainQ = 16384 + 256*ABS(V)$$

where

| | | |
|---|---|---|
| $VgainQ$ | = | speed gain |
| $RCnyc\ new$ | = | new roll compensation gain |
| $RCnyc\ old$ | = | old roll compensation gain |
| $ABS(V)$ | = | absolute value of velocity. |

The numbers 16384, 32768 and 256 are chosen to match the register of the digital controller used by the system and are arbitrary.

The roll compensation gain is varied with speed so that vehicle does not continuously move when stationary or moving slowly, but the system is still able to provide an adequate response when the vehicle is moving at speed.

8. Warp Dynamic Force $$Wfdyn = K_3*[Sny*Woff]$$
$$-Wmax < WFdyn < Wmax$$

where

| | | |
|---|---|---|
| $K_3$ | = | scaling constant (described above) |
| $Wfdny$ | = | dynamic warp force |
| $Sny$ | = | scaled lateral acceleration |
| $Woff$ | = | required warp (see below) |
| $Wmax$ | = | dynamic warp force limit |

The required warp term Wolf is a term used to provide a cornering rate error adjustment. The term is calculated as a chosen function of the difference between the yaw rate demanded by the driver of the vehicle and the actual yaw rate achieved. The yaw rate demanded of the vehicle is proportional to the product of the steered angle of the front wheels of the vehicle and the velocity of the vehicle. The actual yaw rate of the vehicle is measured by the yaw gyrometer 33. The function chosen to generate the Woff from the difference between the demanded and the achieved yaw rate depends on the desired handling characteristics of the vehicle. The term improves vehicle handling during cornering.

The central control processor 26 uses the modal forces calculated from the corner sensors and the calculated dynamic modal forces together in a modelled system of "modal" springs and dampers, to calculate a required modal velocity demands. Considering the mass spring damper equation for the modelled system in Heave mode:

$$Hdem = K_3*IHCC*(Hf + Hfdyn + MHKc*Hxs)$$

where

Figure 4:
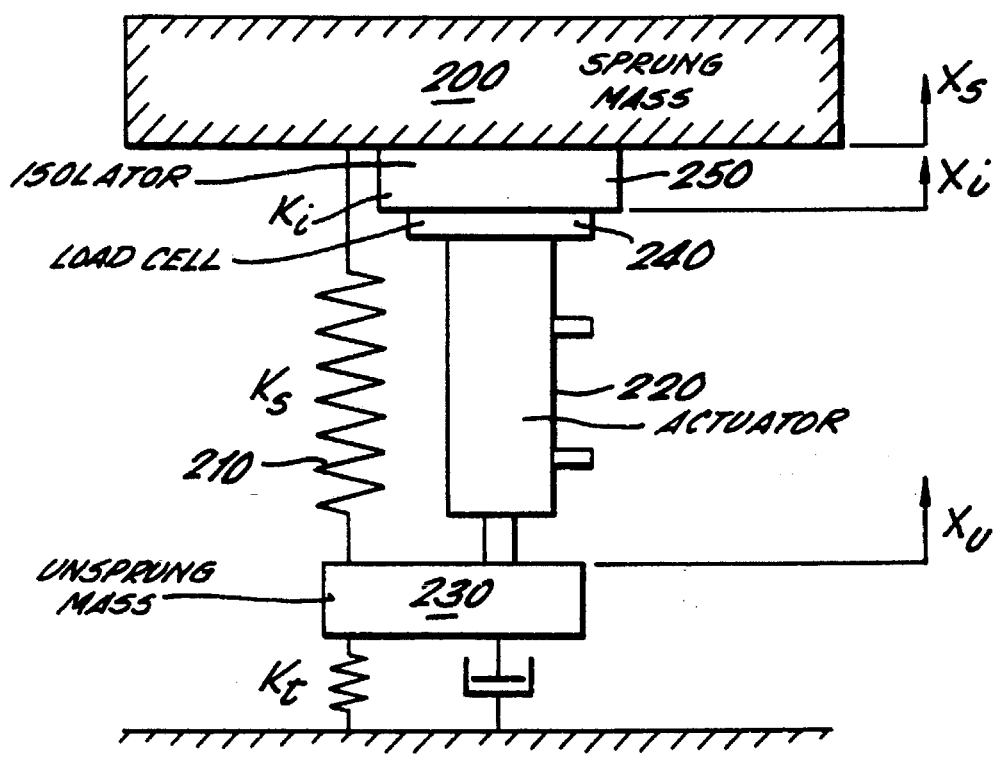
FIG. 4 is a schematic diagram of the physical arrangement of an actuator as used in the active suspension of FIG. 1.

| | | |
|---|---|---|
| $Hf$ | = | Modal Heave Force calculated from load sensors (see before) - positive as shown in FIG. 4 |
| $Hfdyn$ | = | Modal Heave Force due to inertia of vehicle body (see before) |
| $MHKc$ | = | desired modal stiffness in heave |
| $IHCC$ | = | inverse of desired modal damping in heave |
| $Hdem$ | = | required modal velocity - negative for decreasing distances between $Ms$ and $Mu$ |
| $Hxs$ | = | calculated modal displacement (described later) |

In the preferred embodiment a scaling constant $K_3$ is introduced to enable best use of the processor capacity.

Similar calculations are made for modal pitch, roll and warp velocities:

$$Pdem = K_3*IPcc*[Pf + Pfdyn + MPKc*Pxs]$$
$$Rdem = K_3*IRcc*[Rf + RFdyn + MRKc*Rxs]$$
$$Wdem = K_3*IWcc*[Wf + Wfdyn + MWKc*Wxs]$$

| | | |
|---|---|---|
| where $Pdem$ | = | demanded modal pitch velocity |
| $Rdem$ | = | demanded modal roll velocity |
| $Wdem$ | = | demanded modal warp velocity |
| $IPcc$ | = | inverse of required damping in modal pitch |
| $IRcc$ | = | inverse of required damping in modal roll |
| $IWcc$ | = | inverse of required damping in modal warp |
| $MPKc$ | = | required stiffness in modal pitch |
| $MRKc$ | = | required stiffness in modal roll |
| $MWKc$ | = | required stiffness in modal warp |
| $K_3$ | = | scaling constant (hereinbefore described) |

The modal velocity demand signals Hdem, Pdem, Rdem and Wdem are then converted into actuator co-ordinates to signals corresponding to velocities required of the individual actuators. A different velocity signal is sent to each corner contain processor, the signals respectively being DX1cen, DX2cen, DX3cen, and DX4ten.

Taking the quarter of the control system shown in FIG. 1 and considering the communication between the central control processor 26 and the corner control processor 25, the central control processor generates a velocity signal DX1cen as follows:

$$DX1cen = K_3*[IVrfHO*Hdem + IVrfPO*Pdem + IVrfRO*Rdem + IVrfWO*Wdem]$$

| | | |
|---|---|---|
| where $DX1cen$ | = | required velocity of actuator controlled by control device 100 |
| $IVrfHO, IVrfPO, IVrfRO$ and $IVrfWO$ | = | scaling factors to convert modal velocities to co-ordinates of actuator |
| $K_3$ | = | scaling factor to enable adequate use of processor capacity |

The DX1cen signal is sent as a digital control signal to a discrete value. DX1cen a corner velocity demand based on modal stillnesses and damping.

The central control device 26 also calculates and generates two further control signals to sent to corner control device 100, Fcor1 and Xreq1, which shall now be described.

Four signals X1req, X2req, X3req and X4req are generated by the central control device for each of the corner control processors. The signals are displacement demands for the actuators requesting displacements of the actuators to establish a desired active ride height for the vehicle and to counteract displacements of the wheel and hub assemblies due to deflection of the Tyres and isolators (e.g. 38) under "driver input" loading. The X1req signal is calculated as follows.

Firstly a series of dynamic modal displacements are calculated by using a model of a modal spring to represent tyre/isolator stiffness. The model is used to calculate what displacement of the wheel and hub assembly will result from dynamic forces applied to the tyre and isolator. The modelled spring is used to represent the compliance of the tyre and isolator. The mass/spring equation for the system may be written for dynamic modal heave as follows:

| | | |
|---|---|---|
| $HFdyn$ | = | $IHKt^{-1}*(Hreq - Hxdyn)$ |
| where $HFdyn$ | = | dynamic modal heave (hereinbefore described) |
| $IHKt$ | = | inverse of tyre/isolator stiffness in modal heave |
| $Hreq$ | = | required ride height |
| $Hxdyn$ | = | dynamic modal displacement of unsprung masses from the sprung mass |
| Hence $Hxdyn$ | = | $Hreq + IHKt*HFdyn$ |

Scaling with a scaling constant $K_3$ to ensure best use of processor capacity the system uses the following $$Hxdyn = K_3*IHKt*HFdyn + Hreq$$

Similarly for pitch, roll and warp:

| | | |
|---|---|---|
| Pitch: $Pxdyn$ | = | $K_4*IPkt*PFdyn + Preq$ |
| where $Preq$ | = | required pitch of vehicle |
| $IPKT$ | = | modal stiffness of tyres/isolators in pitch |
| $K_4$ | = | scaling constant for best use of processor capacity |
| Roll: $Rxdyn$ | = | $K_4*IRKt*RFdyn + Rreq$ |
| where $Rreq$ | = | required roll attitude of vehicle |
| $IRKt$ | = | modal stiffness of tyres/isolators in roll |
| $K_4$ | = | scaling constant (described above) |
| Warp: $Wxdyn$ | = | $K_4*IWKt*WFdyn + Wreq$ |
| where $Wreq$ | = | required warp of vehicle |
| $IWKt$ | = | modal stiffness of tyres/isolators to warp |
| $K_4$ | = | scaling constant (described above) |

The $Wreq$ is an optional term that can be used as a bias term proportional to the modal warp calculated from the force measurements at the actuators, since it is preferable to have a warp force on the vehicle body during cornering to assist steering.

The above equations are the standard central algorithms of the applicant's active suspension system. However, their use has been found to cause problems on system pressurisation in the start up conditions. At system start up the vehicle is supported solely on its road springs. Considering the Heave mode at static up, since HFdyn is zero on system start up the above equation for Hxdyn reduces to Hxdyn =Hreq, Hreq being the required active ride height. This leads to a sharp jolt being applied to the vehicle if the required active heave displacement Hreq is not equivalent to the passive heave displacement. This will generally be the case since it is beneficial for a vehicle's active ride height to be lower than its passive ride height. By having an active ride height lower than the passive ride height the road springs are compressed by the actuators and the compression force can be used to apply downward force on the wheels of the vehicle.

To cure the jolt problem the equations for calculating Hxdyn, Pxdyn, Rxdyn and Wxdyn have been modified by the present invention. Considering the modified algorithm for generating Hxdyn (the Pxdyn, Rxdyn and Wxdyn algorithms being similarly modified);

$$Hxdyn=K_3 * IHkt * HFdyn+Hreq +K_{20} * SoftK (Hxp=Hreq)$$

Most of the components of the equation have been explained earlier. Hxp is the passive Heave displacement for the vehicle (Pxp, Wxp and Rxp being the passive pitch, warp and roll displacements in the equivalent equations for calculations of Pxdyn, Wxdyn and Rxdyn) and SoftK is the soft start variable which is calculated as follows $$SoftK=K_{21} * Temp\ 1 * Temp\ 2$$

$K_{21}$ is only a constant to enable best use of processor capacity. Temp 1 and Temp 2 are variables which respectively vary in fixed relationship to vehicle velocity and system pressure. The relationship between Temp 1 and vehicle velocity is shown graphically in FIG. 7. The relationship between Temp 2 and system pressure is shown graphically in FIG. 8.

It can be seen from FIG. 7 that Temp 1 is decreased as the vehicle velocity increases in direct proportion to the vehicle velocity, until a velocity threshold of typically 10 mph is reached, after which Temp 1 has the value of zero.

As can be seen from FIG. 8, Temp 2 remains at a maximum value until the pressure of the fluid in the hydraulic control system reaches roughly 1000 p.s.i., after which it decreases in value in direct proportion to system pressure until a pressure threshold is reached, after which Temp 2 is zero. The relationship between Temp 2 and system pressure is chosen to be as shown graphically in FIG. 8. After the engine has been started and the dump solenoid closed to allow pressure to rise in the system, it only takes a few rotations of the pump in order to deliver sufficient flow to raise the system pressure to the pre-charge pressure of the accumulators. From that point on, pressure in the system rises more gradually as the accumulators fill. Accumulator pre-charge pressure is normally between 500 and 1000 psi (3447.5 and 6895 KN/m$^2$ ). Thus 1000 is chosen for the pressure threshold.

The use of SoftK enables the active suspension systems to gradually move the vehicle to active ride height on start up, without a jolt. Once the vehicle is moving quickly and/or the system is at full pressure SoftK is zero and the algorithm functions as in an unmodified system.

The sensor 35 provides the central processor 26 with a signal indicative of vehicle velocity and the sensor 41 provides the central processor 25 with a signal indicative of system pressure. The relationships of Temp 1 and Temp 2 respectively with vehicle velocity and system pressure are programmed into the circuitry of processor 26.

The problem of a "jolt" on system pressurisation mentioned earlier in the specification is thus overcome by adding a soft start routine to the central processor which records passive ride height and then ramps required position of the vehicle from passive to active ride height at a rate based on vehicle speed and system pressure information.

From Hxdyn, Pxdyn, Rxdyn and Wxdyn are calculated dynamic displacements required of each actuator, the X1req, X2req, X3req signals. The calculation for X1req is as follows (the calculation for X2req, etc, being similar):

| X1req | = | $[IVrfHO*HXdyn + IVrfPO*PXdyn + IVrfRO*Rxdyn + IVrfWO*WXdyn]$ |
|---|---|---|
| where X1req | = | required displacement of actuator controlled by control device 100 |
| IVrfHO, IvrfPO, IVrfRo, IVrfWO | = | scaling factors to convert modal displacements demands to the co-ordinates of the actuator controlled by control device 100 |

It can therefore be seen that the actuators are controlled to bring the vehicle to a desired active ride height and to extend to compensate for flexing of the isolators and tyres under dynamic loading.

The Xreq signals are converted into modal co-ordinates and combined with modal displacements calculated from the measured displacements of the actuators, to arrive at values of HXs; Pxs, Rxs, Wxs, the displacement of the modal springs and dampers in the force modes of Heave, Pitch, Roll and Warp. The Hxs, Pxs, Rxs and Wxs terms are then used in the calculations of modal velocity demands from the forces measured by the load cells and the displacements measured by the L.V.I.T.'s.

The central control processor also sends load correction terms to each corner control device; F1cor, F2cor, F3cor and F4cor. The load correction terms are calculated to account for forces transmitted to the vehicle body not measured by the load cells, both due to the springs in parallel with the load cell and the imperfections in the physical suspension system, and also to remove from the detected force at the load cells "driver input" forces resulting from the inertia of the vehicle (Hfdyn, Pfdyn, Rfdyn and Wfdyn).

The correction terms for unmeasured loads are determined by controlling the actuators to extend whilst the vehicle is stationery and measuring the forces that arise when the vehicle body undergoes heave and roll when the vehicle is stationary.

An described above, for each corner processor, the central processor 26 generates three control signals and these are seen in FIG. 1 as F1cor, DX1cen and X1req.

In summary, F1cor is a force correction signal based on "driver" inputs to the central processor 26. It is generated so that the measured F1 can be corrected such that the corner processor does not control the actuators to deflect in response to measured loadings due to cornering, braking, etc.

DX1cen is a corner velocity demand generated by the central processor by resolving measured forces and displacements into modal co-ordinates of heave, warp, pitch and roll, calculating modal velocities from preprogrammed modal stiffness and damping in the four modes and converting the modal velocities into corner co-ordinates.

X1req is a required dynamic displacement signal generated by the central processor 25 to counteract displacements of the isolator 35 and the tyre of the wheel and hub assembly 18 due to "driver" input loading.

The Corner Control Processor

Figure 2A:
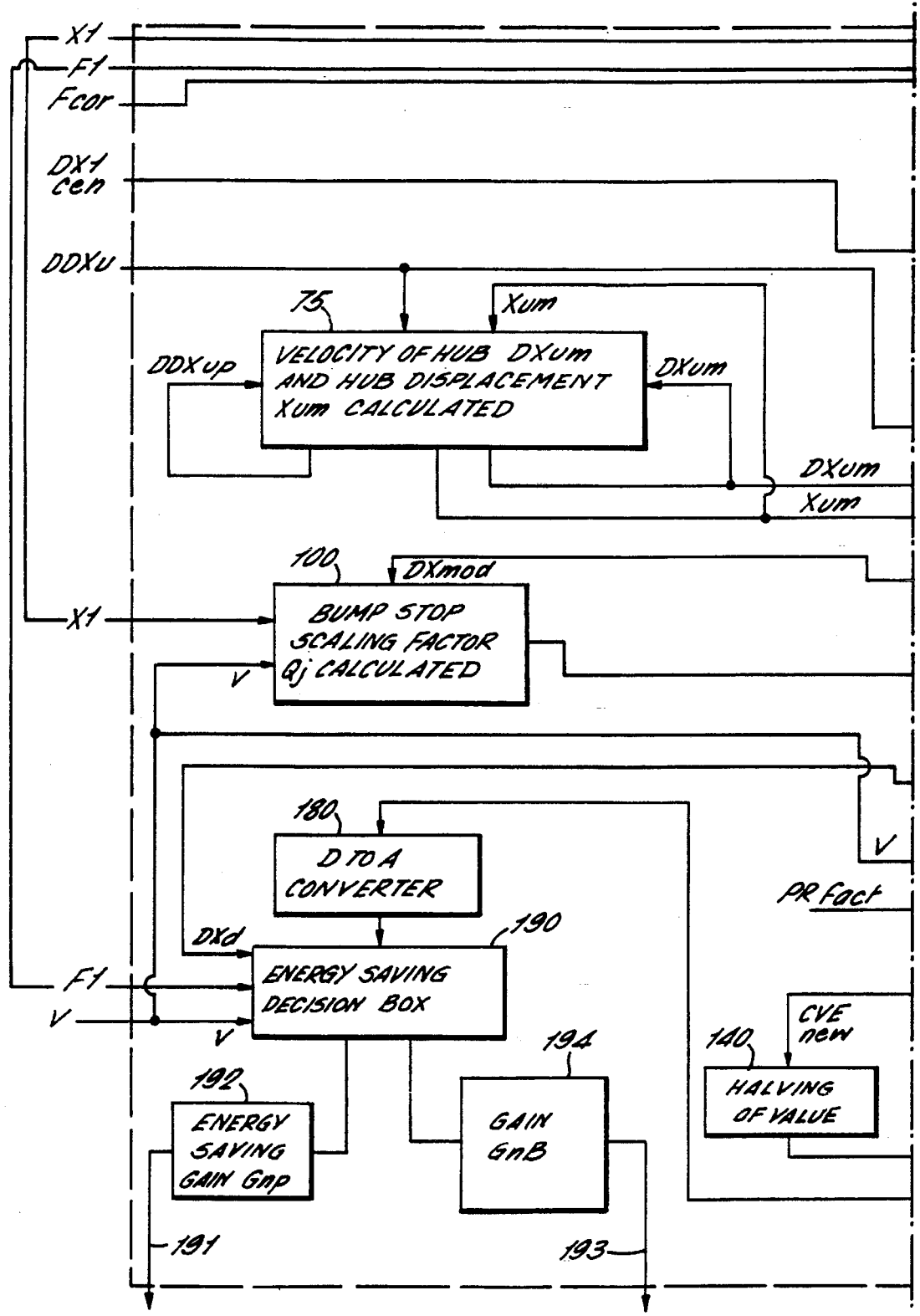
FIG. 2 is a flow diagram for a corner control processor of the active suspension control system of FIG. 1.

The operation of the corner processor 25 will now be explained with reference to FIG. 2 of the application, which is a flow diagram showing how the corner processor calculates a signal to be sent to the servo-valve 22 by processing the signals it receives from the central processor 26 and from the force transducer 28, the LVIT 27 and the hub accelerometer 30. The corner processor functions only in corner co-ordinates and although the central processor 26 calculates signals using modal models, the signals it sends to the corner processor 25 are in the corner co-ordinates of the processor 25.

The corner processor 25 receives a signal X1req from the central processor 26. The signal X1req is a corner displacement demand generated by the central processor 25, which requires a displacement of the corner actuator to counteract displacement of the isolator 38 and the tyre due to "driver input" loading on the vehicle, that is to say loading due to the forces arising to acceleration, deccelleration, cornering etc. as opposed to loading on a vehicle due to unevenness of the road. The X1req signal also demands active ride height.

At 40, the following equations are carried out;

| | DXreq | = | $Kdyn*(Xreq - Xdymn\ old)*K_5$ | (A) |
|---|---|---|---|---|
| | Xdymnew | = | $Xdymnold + DXreq*Idyn$ | (B) |
| Where | | | | |
| | DXreq | = | required dynamic velocity | |
| | Kdyn | = | corner loop gain | |
| | Idyn | = | dynamic displacement filter time constant | |
| | Xdymnew | = | filtered dynamic displacement demand | |
| | Xdymold | = | previous filtered displacement demand | |
| | $K_5$ | = | constant chosen to make best use of the processor capacity. | |

The above equation B is essentially a closed loop displacement demand control loop which has a digital filter controlled by the constant Idyn.

The filtered dynamic displacement demand Xdym is then fed to stage 50 where it is combined with the measured displacement X1, a measured force F1 and the F1cor signal generated by the central control processor 26. As mentioned before, the F1cor signal is a force correction signal generated by the central processor 26 which is combined with the measured force signal such that the corner processor does not "see" loading on the vehicle due to driver input forces on the vehicle, but only sees those forces on the vehicle arising from road inputs. Such driver inputs are "termed herein "dynamic" inputs. At 50, the corner processor performs the following calculation;

$$DXcor = ICC*K_6*[K_7*(F1 + F1cor + Kcs*X*K_8 + K_9*(MKs*(X1 - Xdymn))] \quad (C)$$

Where

| | | |
|---|---|---|
| $DXcor$ | = | corner based velocity demand |
| $ICC$ | = | inverted corner velocity damping |
| $F_1$ | = | measured force |
| $Fcor$ | = | corner received load correction |
| $Kcs$ | = | corner parallel spring stiffness |
| $X1$ | = | measured displacement |
| $Mks$ | = | required corner stiffness |
| $Xdymn$ | = | filtered dynamic displacement demand |
| $K_6, K_7, K_8$ | = | contstants used to make most |
| $K_9,$ | | effective use of processor capacity. |

Essentially the corner processor models a spring and damper system with a chosen stiffness Mks and the chosen damping rate ICC.

The measured force F1 in the equation (C) is modified by the F1cor term such that the corner processor does not consider dynamic loading and in a similar fashion the measured displacement x is modified by removing Xdymn, the filtered dynamic displacement demand. It is necessary to filter the dynamic displacement demand for combination with the measured displacement since abrupt jumps in the control of the actuator would occur if filtering of the central control signals was not carried out.

The actuator 10 acts between the vehicle body 29 and the suspension arm 15 in parallel with a normal road spring 36. The force applied on the vehicle body 29 by the road spring 26 is accounted for by the term Kcs*X appearing in the equation (C).

The DXcor signal generated is then combined at 16 with the DX1cen signal generated by the central control processor. As explained before, the DX1cen signal generated by the central control processor is a corner velocity demand (is a demand which requires a velocity of the actuator) calculated modally by the central processor of the vehicle. At 60, it is combined with the DXcor signal as follows;

| | | | |
|---|---|---|---|
| $DXerr$ | = | $DX1cen - DXcor$ | (D) |
| $DXeOm:DXeOLnew$ | = | $DXeOm:DXeOLold + Kvel*$ $(DXerr - DXeOm:DXEOLold)$ | (E) |

Where

| | | |
|---|---|---|
| $DXerr$ | = | velocity error |
| $DX1cen$ | = | corner velocity demand from central processor |
| $DXeOm:DXeOLnew$ | = | filtered velocity error |
| $DXeOm:DXeOLold$ | = | previous velocity error |
| $Kvel$ | = | filter time constant |

The calculated velocity error DXerr is filtered using a filter time constant Kvel, since the central processor operates at a different clock frequency from the corner processors and abrupt changes in control occur if filtering is not employed.

Figure 3:
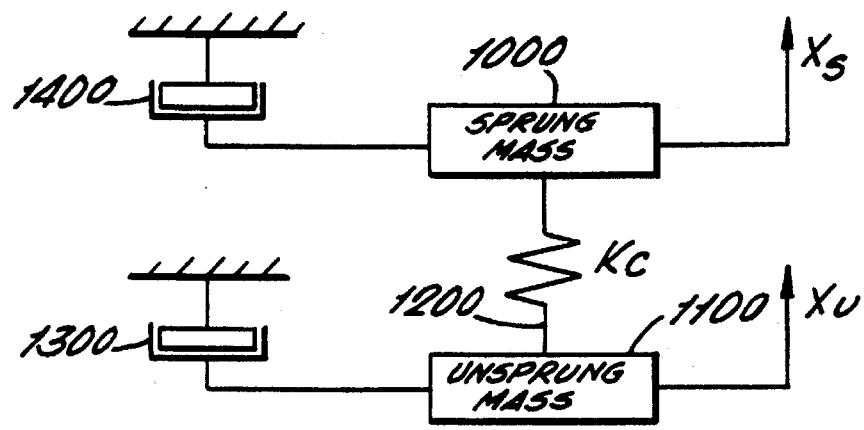
FIG. 3 is a schematic diagram illustrating suspension model considered by the active suspension processors of FIGS. 1 and 2.

The corner control processor considers a system model as shown in FIG. 3 which consists of a sprung mass 1000, an unsprung mass 1110, a spring 1200 acting therebetween. The model uses the "sky-hook" damper principle, a damper 1300 being connected between the unsprung mass 1100 and a fixed reference and a damper 1400 being connected between the sprung mass 1000 and a fixed reference. The damper 1300 has a damping constant Cu and a damper 1400 has a damping constant Cc.

The modelled system is not equivalent to the actual physical system which is shown schematically in FIG. 4. The sprung mass of the vehicle 200 is in fact suspended by a road spring 210 and an actuator 220, interposed between the sprung mass 200 and an unsprung mass 230, which is the wheel and hub assembly of the vehicle. A load cell 240 and an isolator 250 can also be seen in the figure, interposed between the unsprung mass 100 and the actuator 220. This system obviously corresponds to the schematic arrangement of FIG. 1.

In the physical system, assuming no isolator damping, the force in the load cell 250 is F1m where:

$$F1m = Ki*(Xi - Xs)$$

Where $Ki$ = isolator stiffness and Xi and Xs are the displacements illustrated in FIG. 4. also if the actuator displacement=Xj=Xu-Xi then:

$$F1m = Ki(Xu - Xj - Xs)$$

Where

| | | |
|---|---|---|
| $Xu$ | = | displacement of unsprung mass |
| $Xs$ | = | displacement of sprung mass | therefore $$Xu - Xs = Xj + F1m/Ki \quad (F)$$

also by differentiating:

$$Dx_s = DXu - DXj - DFm/Ki \quad (G)$$

The equations of motion for the model used in the corner controller are:

$$Ms*DDXs = Kc*(Xu - Xs) - Cc*DXs \quad (H)$$

$$Mu*DDXu = Kc*(Xu - Xs) - Cu*DXu \quad (I)$$

where

MS*DDXs is the measured load cell force F1m.
Kc is the stiffness of the model
Cc is the damping of the model Substracting (I) from (H) and ignoring factors of 2, gives:

$$F1m=Kc*(Xu-Xs)-Cc*DXs+Cu,DXu+Mu*DDXu \quad (J)$$

Substituting (F) and (G) into (J) gives:

$$F1m=Kc*(Xj+F1/Ki)-Cc*(DXu-DXj-DF1/Ki)+Cu*DXu+Mu, DDXu$$

The requirement to maintain adequate control over the relative motion of the two masses implies that Kc<<Ki. Assuming this then the above equation can be re-written as:

$$F1m=Xj,Kc+DXj*Cc+DXu*(Cu-Co)+DDXu*Mu-DFm*Cc/Ki$$

The code requires a velocity drive output to the actuator. Therefore, making velocity the subject of the equation:

$$DXj=1/Cc*[Fm-Xj*Kc-DXu*Cu-Mu*DDXu]+DXu-DFm/Ki$$

During active suspension development it was decided that the term DFm/Ki was only of minor importance and was also relatively difficult to generate and it has been dropped from the code.

The term DXu*Cu/Cc is combined with DXu generally in the control strategy with DXu multiplying a hub damping gain KufC. The algorithm is implemented in full in the corner processing leaving the following as the basic velocity drive.

$$DXj = 1/Cc*[Fm - Xj*Kc] + KufC*DXu - Mu*DDXu$$

where

| | | |
|---|---|---|
| $1/Cc$ | = | inverted damping $ICc$ |
| $Fm$ | = | load cell force $F$ |
| $Xj$ | = | generalised modal displacements $Hxs$ etc |
| $Kc$ | = | required corner stiffness $MKs$ |
| $KufC$ | = | hub velocity gain |
| $DXu$ | = | estimated hub velocity |
| $Mu$ | = | hub acceleration gain $MMc$ |
| $DDXu$ | = | measured hub accleration |

Looking at the above equations, it can be seen that the first pan of the equation has already been accounted for in the calculation of DXcor wherein Fm appears as F1 and the term Xj,Kc is taken account for MKs*(X-Xdymn). The remainder of the equation is now added at 70, and the corner control processor performs the following calculation;

$$DXmod = [K_{10}*MMc*DDXu + Kufc*DXum]*K_{11} + \qquad (K)$$
$$[K_{12}DXcor + DXeOm:DXeOl]*K_{13} - DXfm$$

where

| | | |
|---|---|---|
| $DXmod$ | = | corner velocity demand with hubs |
| $MMc$ | = | hub mass gain |
| $DDXu$ | = | measured hub acceleration |
| $Kufc$ | = | hub damping gain |
| $DXum$ | = | unsprung mass velocity |
| $DXcor$ | = | corner based velocity demand |
| $DXeOm:DXeOl$ | = | filtered velocity demand |
| $DXfm$ | = | filtered corner velocity demand |
| $K_{10}, K_{11},$ | = | constants to enable best use of |
| $K_{12} K_{13}$ | | processor capacity. |

The term MMc*DDXu can be seen to correspond to Mu*DDxu and the term Kufc*DXum corresponds to the term Kufc*DXu. The hub mass gain MMc and the hub damping gain Kufc will be determined for a particular wheel hub assembly.

It will also be noted that DXcor, the corner based velocity demand and also DXeom:DXeol, the filtered velocity error are added to total velocity demand, these having already been calculated.

The terms Xum, the velocity of the unsprung mass and DXum the displacement of the unsprung mass are calculated at 75 from the measured acceleration DDXu, by the following equations;

$$DXumnew = DXumold + KV1*DXumold + KV2*[K_{14}*(DDXunew + DDXuold) - K_{15}XUmold] \qquad (L)$$

$$Xumnew = Xumold + KV_3*(DXumnew + DXumold) \qquad (M)$$

where

| | | |
|---|---|---|
| $DXumnew$ | = | velocity of hub |
| $DXumold$ | = | previous velocity of hub |
| $DDXunew$ | = | measured hub acceleration |
| $DDXold$ | = | previous measured hub acceleration |
| $Xumnew$ | = | hub displacement |
| $Xumold$ | = | previous hub displacement |
| $KV1$ | = | hub filter constant |
| $KV2$ | = | hub filter constant |
| $KV3$ | = | hub filter constant |
| $K_{14}, K_{15}$ | = | constants to enable best use of processor capacity. |

It can be seen from the above that the hub velocity is calculated iteratively as the sum of the old hub velocity plus a velocity increase averaged over a clocked time period. Similarly, the hub displacement is calculated iteratively as the sum of the old hub displacement and a displacement calculated from the average velocity over a clocked time period.

High frequency components of the velocity signal are removed by the term DXfm, which is obtained at 80 by passing the Xmod through a low pass filter for corner velocity demands as follows;

$$DX1fmnew = DX1fmold + Hpftc * DX1mod \qquad (N)$$

where

| | | |
|---|---|---|
| $DX1fm$ | = | low pass filtered corner velocity demand |
| $Hpftc$ | = | filtered corner velocity demand time constant |
| $DX1mod$ | = | corner velocity demand with hubs |

The DXmod signal is also combined with the measured displacement X1 in a bump stop algorithm, such as that described in International Application No. PCT/GB 90/00621. This is done at 100 and a "bump stop" scaling factor Qj is generated, which modifies the velocity signal when the actuator is approaching its limits of motion.

In the system of the present invention the Qj bump stop factor is modified to provide a term Qj1 for the corner processor as follows:

$$Qj1 = (Qj * VgainQ)/32768$$

where

| | | |
|---|---|---|
| $VgainQ$ | = | $16384 + 256 + ABS(V)$ |
| where | | |
| $Qj$ | = | "bump stop" scaling factor |
| $QJ1$ | = | modifield scaling factor |
| $VgainQ$ | = | speed gain |
| $ABS(V)$ | = | absolute value of vehicle velocity. |

At 90 a final actuator demand is calculated as follows;

$$DXd = (K_{16}*Qj1*DXmod + MKv*Xdm)*K_{17} \qquad (O1)$$

$$Xderr = K_{18}*(Xdm - X1 + Xdynm) \qquad (O2)$$

where

| | | |
|---|---|---|
| DXd | = | corner velocity demand |
| Qj1 | = | scaling factor (see above) |
| DXmod | = | corner velocity demand |
| MKv | = | self-levelling damping |
| Xdm | = | modelled displacement |
| Xderr | = | displacement error |
| X1 | = | measured displacement |
| Xdynm | = | filtered displacement demand. |
| $K_{16}, K_{17},$ | = | constants to enable best use |
| $K_{18}$ | | of processor capacity. |

Qj1 therefore varies the gain of the force error control loop with velocity. The Qj1 lowers the gain at low speeds to prevent constant motion of the vehicle at low speeds and ramps up the gain at high speeds to enable quick operation of the control system.

The Xdm signal in (02) above is calculated from the DXd signal at 100 by the following equation:

$$Xdmnew = Xdmold + Ing*Dxd \qquad (P)$$

where

| | | |
|---|---|---|
| Xdmnew | = | new modelled actuator displacement |
| Xdmold | = | old modelled actuator displacement |
| Ing | = | integration constant |
| Dxd | = | corner velocity demand. |

Once Xdmnew is calculated then the following check is made at 110:

$$\text{is } (Xdm + Xdynm) > 0 \qquad (Q)$$

If this is so then that actuator is compressing and the following check is made:

$$\text{is } (Xdm + Xdynm) > Xlimc \qquad (R)$$

If the check is positive then the value of Xdm output from 100 is not that calculated by equation P above, but instead is generated as:

$$Xdm = Xlimc - Xdynm \qquad (S)$$

If the check made at Q is negative then actuator is extending and the following check is also made:

$$\text{is } (Xdm + Xdynm) < -Xlime \qquad (T)$$

if the check is positive then the value of Xdm output by 100 is not the value calculated by equation P but the following value:

$$Xdm = -Xlime - Xdymn \qquad (U)$$

In equations Q, R, S, T, U above the variables are as follows:

| | | |
|---|---|---|
| Xdm | = | most recent value of modelled actuator displacement |
| Xdynm | = | filtered corner dynamic displacement demand |
| Xlimc | = | limit of compression of actuator |
| Xlime | = | limit of extension of actuator. |

The terms MKv*Xd and the term Hpftc*DX1mod used in equations 01 and N together provide the system with a self-levelling control loop which biases the system towards "active" ride height. This will be discussed further hereinafter.

Once the final actuator demands DXd and Xderr have been calculated they are combined together to form a current velocity estimate (C.V.E.) at 120 as follows:

$$C.V.E. = K_{21}*PRfact*[K_{22}*Gf*(DXd+DXreq) + Gd*Xderr] - Xbiasm \qquad (V)$$

where

| | | |
|---|---|---|
| PRfact | = | pressure factor |
| Gf | = | velocity loop gain |
| DXd | = | corner velocity demand |
| DXreq | = | required dynamic velocity |
| Gd | = | displacement loop gain |
| Xderr | = | displacement error |
| Xbiasm | = | valve offset. |
| $K_{20}, K_{21},$ | = | constants to enable best use |
| $K_{22}$ | | of processor capacity. |

The PRfact term is a parameter derived from the sensed pressure of the fluid of the system and is generated to take account of fluctuations in the system pressure. It is not essential to the invention and will not be elaborated.

The value offset term Xbiasm is calculated from the Xderr signal at 130 by the following iterative calculation:

$$Xbiasmnew = Xbiasmold + Kbias*Xderr \qquad (W)$$

where

| | | |
|---|---|---|
| Xbiasmnew | = | new valve bias |
| Xbiasmold | = | previous valve bias |
| Kbias | = | time constant |
| X1derr | = | displacement error. |

The valve bias term biases the valve to a position to maintain "active" ride height.

The final output is essentially:

Velocity = Force control + Displacement Error Control − Valve bias

The active suspension requires a high level of gain in the force loop to control the actuators at high vehicle speeds. However the high gain level is not necessary at low speeds and in fact leads to constant motion of the vehicle body when the vehicle is stationary or at low speeds.

This problem has been overcome by using lower values for load gain. Generally the values are switched from half to full values at a speed threshold in the range 5 to 10 miles an hour.

The solution can be modified by adding a filter to sensor 35 and calculating a speed gain such that relevant gains are ramped from half to full values give a smoother transition.

The force loop is high pass filtered (as has been seen previously) and therefore is zero on pressurisation of the system. Therefore if a valve drive of 100 is required to maintain active ride height at start up it is derived from Gd*Dxderr−Xbiasm.

The Xbiasm term has usually been started at zero, and is slowly integrated from the displacement error of the actuator at 130. Because Xbiasm is initially zero and a valve offset is needed to hold the strut steady, the valve drive on start up must come from the displacement error Xderr multiplied by Gd (equation V). The lower the value of Gd the greater displacement error is needed to cause the required offset. However, whilst driving Gd should be kept as low as possible no improve ride harshness. With a low Gd the actuator wanders until the Xbiasm is established and alone provides the drive necessary to hold the valve steady.

This problem can be solved in two ways. First EEPROM (Electronically Erasable Programmable Read-Only Memory) can be provided in the corner processor 26 at 130 which holds tale last used values of Xbiasm for initialisation.

The second solution is to vary relative importance of Gd and Kbias on the start up by providing a new algorithm at 120. The gain Gd is ramped down from an initial high value to a normal operating value by an algorithm that considers system pressure and vehicle speed by an algorithm in the corner processor.

The gain Gd is varied by an algorithm functioning in the corner processor 25. The algorithm works by a Modification Gain (MG) term which is varied with speed as follows:

MG=32767−ABS (V) * 256 where

MG=modification gain

ABS (V)=absolute value of vehicle velocity

32767=constants used by processor and 256

The processor checks whether

MG≦16384 and if the check is positive sets MG=16384

Gd is iteratively calculated as:

Gdnew=(Gdold * MG)/32768

Before a servo valve drive signal is output the C.V.E. signal is modified by halving its value at 140 and performing the following operation at 150 and 160:

V.R.=C.V.E.new−C.V.E.old at 150  (X)

and

VeIL=K$_{20}$*lead*V.R. at 160  (Y)

where

| | | |
|---|---|---|
| V.R. | = | velocity rate |
| C.V.E.new | = | most recent C.V.E. |
| C.V.E.old | = | previous C.V.E. |
| L.R. | = | lead rate |
| lead | = | lead constant |
| VeIL | = | defined above at (Y). |

The output of 160 is combined with 0.5.C.V.E. at 170 and then the output is doubled at 180.

A lead is introduced at 150 which acts as a digital differentiator and improves the response of the system.

The final valve drive is converted from a digital signal to an analogue signal at 180. At 190 a decision is made on whether the signal is output to servo-valve with the energy saving valve allowing no flow or vice-versa. The decision is made at 190 by comparing the sense of the net force on the wheel and hub assembly (as measured by the force transducer) with the sense of the demanded velocity. If both are in the same sense then the energy saving valve is used to control actuator motion, with both chambers A and B connected together and the energy saving valve 39 metering flow between the chambers without the need for energy consumption in supply of pressurised fluid. In this case the signal is output at 191 after passing through an energy saving gain Gnp at 192. On the other hand if the net force and required velocity are in the opposite sense then the servo-valve 22 is controlled to connect one chamber to the source of pressurised fluid and the other to the exhaust for fluid. In this case the control signal is output at 193 after passing through gain GnB at 194.

The energy-saving valve has its own analogue closed loop electronic control system (generally standard for such valves). The valves control system is adapted such that the current supplied to move the spool of the valve is proportional to the difference between the demanded valve position and the actual valve position. The control system generally increases the valve drive as shown in FIG. 5 with increasing valve displacement error, the increase being proportional to error until an error of 20% is reached, this being a considerable error and therefore requiring full valve drive. The response of the valve is therefore not linear with displacement error up to 100% but has a steeper response for displacement errors up to 20% error and thereafter provides full valve drive. In start up conditions problems can be caused since the valve drive from the active suspension system will be small since the preferred position of the valve is only just shut. If the energy saving valve is only slightly open and the required position is only slightly shut then the drive caused by the, displacement error may be insufficient to shut the valve, particularly since the system pressure may be low because of leaking bypass valves.

The problem of having a bypass valve in an energy saving system which is slightly open on start up and therefore causes wandering motion is cured by modifying a processor 25 at 190 to demand the bypass valve fully shut (100% valve drive) at low vehicle speeds. The processor 25 receives a signal indicative of vehicle speed from the sensor 35 and then assesses whether:

V<Vmin where

V=measured velocity

Vmin=preprogrammed minimum speed

Generally Vmin is set between 5–10 mph and preferably at 6.4 mph.

If V is less than Vmin then the processor 3a demands the energy saving valve to be fully shut, Vmin forming a velocity threshold.

The valve is demanded fully shut at low speeds by modifying the final output to the valve by including a variable BcloseC in the final drive at 190 where BcloseC=Bclose+(BcloseS−Bclose) * VgainV and VgainV= (16384+256 * ABS (V))−32768

The BcloseC variable is used to modify the final bypass valve drive when an energy saving operation is not called for in that iteration. Bclose is the "vehicle-moving" value; BcloseS is the stationary value. The generating of the variable makes the switch from BcloseS to Bclose progressive with speed. The resultant value is added to the valve drive. Greater positive values of BcloseC demand a greater closure of the bypass valve.

VgainV gives 16384 when the vehicle is stationary (BcloseC=BcloseS). It gives 0 when moving (BcloseC =Bclose).

The system has inherent self-levelling, which is governed by the values Hpftc and MKv in equations N and O respectively.

Any changes in the loading of a stationary vehicle (e.g. luggage, passengers and fuel) should not cause the vehicle body to move substantially. Also any movement should be removed through self-levelling at a "reasonable" rate. Accordingly the self-levelling parameters Hpftc and MKv are switched at a speed threshold (typically 5 to 10 mph) between "fast" self-levelling when the vehicle is stationary and slow moving and **slow" self levelling during driving. If the Xlbiasm value is not stored on EEPROM as mentioned above, then it too should be switched at the speed threshold between low and high speed values.

HpftC is the high pass filter time constant which appears in algorithm (N). The algorithm (N) acts to provide a filtered velocity demand DX1fm from a generated DX1mod signal which is removed from the next DX1mod signal to be generated such that the low frequency component of DX1mod is removed. An increase in Hptfc leads to an increase in the bandwidth of frequency of DX1fm and therefore a narrowing in the bandwidth of frequency of the DX1mod signal (DX1mod will only contain higher frequencies).

Self-levelling is a low frequency demand. Any offsets in the signals generated by the load cells and hub accelerometers will be removed by the high pass filter of (N), governed by Hpftc. The higher Hpftc in (N), the quicker offsets are removed and the faster that self-levelling will occur. Any low frequency inputs to the vehicle such as adding of luggage or a person leaning on the vehicle, will be removed from the generated DX1mod signal by DX1fm and therefore the vehicle will be very stiff to such low frequency inputs, which is the desired result of the system. This algorithm (N) compensates for sensor offsets and sensor drifts and also enables the suspension to be very stiff to low frequency inputs.

The Hpftc signal is switched at a speed threshold from a high value for low vehicle speeds (which high value provides fast self-levelling) to a low valve for high vehicle speeds (which provides slower self-levelling).

In algorithm P above a modelled actuator displacement Xdm is calculated. The modelled displacement describes the ideal motion of the actuator. The error between modelled displacement and the real displacement is calculated by algorithm O2 above and the error is multiplied by gain Gd in algorithm V in a displacement error loop.

To ensure fast self-levelling Xdm should be reduced to zero as quickly as possible, i.e. the displacemant of the actuator should be zero as quickly as possible. The parameter MXv enables the quick reduction of Xdm to zero by acting as a low pass filter in velocity demand Dxd in algorithm 01, the Xdm variable being an integral of DXd in algorithm P. Therefore when DXmod is zero Xdm will be reduced to zero by the parameter MKv acting as a low pass filter so that DXd is brought to zero. This is parwcicularly necessary since the integrator involved in calculating Xdm will produce a signal with a constant offset unless filtered.

Figure 9:
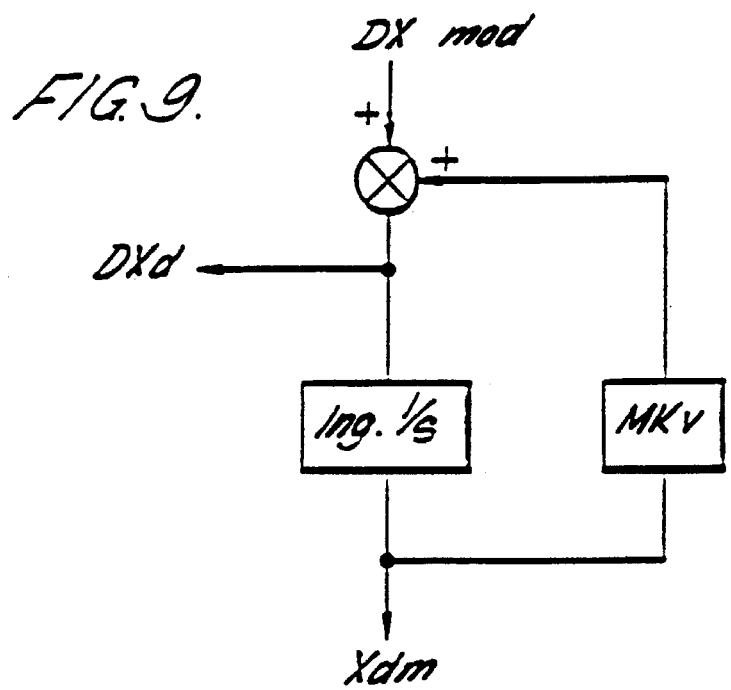
FIG. 9 is a control schematic illustrating the relationship between certain parameters used in the active control suspension system of FIG. 1.

A schematic illustrating the relationship between DX1mod, DXd and Xldm is shown in FIG. 9 (Qj and constants being ignored for simplicity). From this the closed loop transfer function can be seen to be:

$$\frac{Xdm}{DXmod} = \frac{Ing}{S + Ing.MKv}$$

Figure 10:
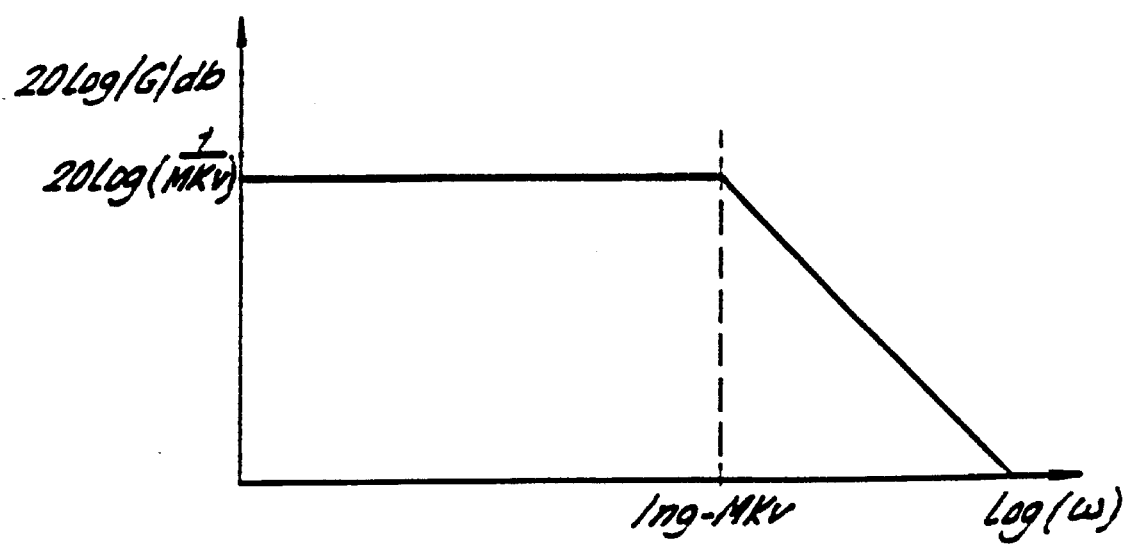
FIG. 10 is a Bode diagram showing the frequency response characteristics of the control system of FIG. 9.

The Bode plot for this system is shown in FIG. 10. The cut-off frequency of the system is Ing * MKv. Increasing MKv decreases the gain of the system and also increases the break frequency. Alteration of MKv to increase the range of frequencies increases the speed of the self-levelling since a greater range of frequencies are considered.

It will be seen that the self-levelling algorithms of the control system bring DXmod to zero by removing from DXmod a filtered signal DXfm of a bandwidth determined by Hpftc and by filtering Xdm by a low pass filter of a bandwidth by MKv. Hpftc and MKv are altered with vehicle speed to provide fast self-levelling when the vehicle is stationery or moving slowly and slower self-levelling when the vehicle is moving quickly.

It is preferable to ramp Hpftc and MKv between their high-and low speed values to ensure a smooth transition. However, it is disadvantagous to have continuously varying self-levelling characteristics throughout the speed range since such continuously varying self-levelling and have a detrimental effect on vehicle ride by increasing stiffness. It is important to have self-levelling at its "vehicle moving rate" at anything above say 10 mph. There is no advantage in fast self-levelling above this point. One set of values should be used for low speeds and another for high speeds.

In the above described preferred embodiment a distributed active suspension is described processing shared between a central processor 26 and corner processers, e.g. 25. However, the present invention is not limited to use in a distributed processing system and the preferred embodiment is given by way of example only. The present invention can be applied to any kind of active suspension system, whether the processing means are concentrated centrally or distributed.

I claim:

1. A vehicle suspension system comprising:
    an actuator connected between a body of the vehicle and a wheel and hub assembly of the vehicle,
    a road spring connected between the body of the vehicle and the wheel and hub assembly in parallel with the actuator,
    a source of pressurized fluid,
    an exhaust for fluid,
    valve means for controlling flow of fluid to the actuator from the source of pressurized fluid and from the actuator to the exhaust for fluid,
    sensor means for generating signals indicative of sensed vehicle parameters, and
    a control system for controlling the actuator comprising processor means which processes the signals generated by the sensor means and controls the valve means to control fluid flow to and from the actuator, the processor means outputting a control signal to the valve means and thereby controlling the actuator, wherein the processor means in normal operating conditions uses a first set of preprogrammed constants in algorithms used by the processor means to calculate the control signal outputted thereby,
    the processor means uses a different set of preprogrammed constants in the algorithms at low pressures of the fluid supplied by the source of pressurized fluid, and when the passive ride height of the vehicle supported by the road spring alone is different from the active ride height of the vehicle when the processor means is operative, the processor means at low fluid supply pressure ramps the ride height of the vehicle from the passive ride height at a rate determined by ramping means provided in the processor means.

2. A vehicle suspension system as claimed in claim 1 wherein the sensor means measures the pressure of the fluid supplied by the source of pressurized fluid and the processor means calculates a desired active ride height which is varied by the processor means with variations in the sensed fluid pressure.

3. A vehicle suspension system as claimed in claim 2 wherein the processor means calculates a desired ride height which is varied with increases in fluid pressure until a pressure threshold is reached, whereafter the desired active ride height remains unaltered by pressure variations.

4. A vehicle suspension system comprising:

an actuator connected between a body of the vehicle and a wheel and hub assembly of the vehicle, a source of pressurized fluid, an exhaust for fluid, valve means for controlling flow of fluid to the actuator from the source of pressurized fluid and from the actuator to the exhaust for fluid, sensor means for generating signals indicative of sensed variable vehicle parameters, and a control system for controlling the actuator comprising processor means which processes the signals generated by the sensor means and controls the valve means to control fluid flow to and from the actuator, the processor means outputting a control signal to the valve means, and thereby controlling the actuator, wherein the processor means in normal operating conditions uses a first set of preprogrammed constants in algorithms used by the processor means to calculate the control signal outputted thereby, the processor means uses a different set of preprogrammed constants in the algorithms at low pressures of the fluid supplied by the source of pressurized fluid, the valve means comprises first valve means for metering flow of fluid to the actuator from the source of pressurized fluid and flow of fluid from the actuator to the exhaust for fluid, the actuator comprises a piston and cylinder arrangement having two chambers in the cylinder divided by the piston, the valve means comprises second valve means to connect both chambers together to allow flow from one chamber to the other, the processor means controls the second valve means to connect both chambers together when net force on the actuator is in the same sense as the motion required of the actuator by the processor means, and the processor means is adapted to control the valve means such that the valve means do not connect both chambers together until a chosen fluid pressure threshold is reached.

5. A vehicle suspension system as claimed in claim 4 wherein the sensor means generates a signal indicative of vehicle velocity and the processor means operates such, that the possibility of both chambers being connected together exists only when the sensed vehicle velocity is above a chosen velocity threshold.

6. A vehicle suspension system comprising:

an actuator connected between the body of the vehicle and a wheel and hub assembly of the vehicle, a source of pressurized fluid, an exhaust for fluid, valve means for controlling the flow of fluid to the actuator from the source of pressurized fluid and from the actuator to the exhaust for fluid, sensor means for generating signals indicative of sensed variable vehicle parameters, and a control system for controlling the actuator comprising processor means which processes the signals generated by the sensor means and controls the valve means to control fluid flow to and from the actuator, the processor means outputting a control signal to the valve means and thereby controlling the actuator, wherein the processor means in normal operating conditions uses a first set of preprogrammed constants in algorithms used by the processor means to calculate the control signal outputted thereby, the processor means uses a different set of preprogrammed constants in the algorithms at low pressures of the fluid supplied by the source of pressurized fluid, the sensor means generates a signal indicative of forces of the vehicle and a signal indicative of length of the actuator, the processor means outputs a control signal to valve means to vary the length of the actuator, and the control system has a closed loop displacement error control system and a system for biasing the valve means to an offset condition in which the fluid flow to and from the actuator is controlled such that the actuator applies a force sufficient to counter loading on the actuator and thereby maintain a required ride height, and the processor means has memory means which stores on deactivation of the suspension system the value of one or more signals generated by the sensor means and produced by the system for biasing the valve means, the processor means using the stored value or values when the suspension system is next activated.

7. A vehicle suspension system comprising:

an actuator connected between a body of the vehicle and a wheel and hub assembly of the vehicle, a source of pressurized fluid, an exhaust for fluid, valve means for controlling the flow of fluid to the actuator from the source of pressurized fluid and from the actuator to the exhaust for fluid, sensor means for generating signals indicative of sensed variable vehicle parameters, and a control system for controlling the actuator comprising processor means which processes the signals generated by the sensor means and controls the valve means to control fluid flow to and from the actuator, the processor means outputting a control signal to the valve means and thereby controlling the actuator wherein, the processor means in normal operating conditions uses a first set of preprogrammed constants in algorithms used by the processor means to calculate the control signal outputted thereby, the processor means uses a different set of preprogrammed constants in the algorithms at low pressures of the fluid supplied by the source of pressurized fluid, the sensor means generates a signal indicative of forces on the vehicle, a signal indicative of the length of the actuator, a signal indicative of the velocity of the vehicle and a signal indicative of the fluid pressure of the fluid from the source of pressurized fluid, and the control system comprises a closed displacement error control loop and a control loop for biasing the valve means to maintain a required ride height for the vehicle, a gain being used in the displacement error loop which is varied by the processor means with changes in fluid pressure.

8. A vehicle suspension system as claimed in claim 7 wherein the gain in the displacement error loop is also varied with changes in vehicle velocity.

* * * * *